(No Model.)

J. SWEGLES.
AXLE CUTTER.

No. 482,767. Patented Sept. 20, 1892.

Witnesses
A. L. Abbie
Mary B. O'Dogherty

Inventor
John Swegles
By Mo. Spragnet &c.
Attys.

UNITED STATES PATENT OFFICE.

JOHN SWEGLES, OF WAYNE, MICHIGAN.

AXLE-CUTTER.

SPECIFICATION forming part of Letters Patent No. 482,767, dated September 20, 1892.

Application filed February 23, 1892. Serial No. 422,378. (No model.)

*To all whom it may concern:*

Be it known that I, JOHN SWEGLES, a citizen of the United States, residing at Wayne, in the county of Wayne and State of Michigan, have invented certain new and useful Improvements in Axle-Cutters, of which the following is a specification, reference being had therein to the accompanying drawings.

This invention relates to new and useful improvements in axle-cutters; and it consists in the peculiar construction, arrangement, and combination of the various parts, whereby a simple and efficient tool for cutting axles is obtained, all as more fully hereinafter described.

Figure 1:
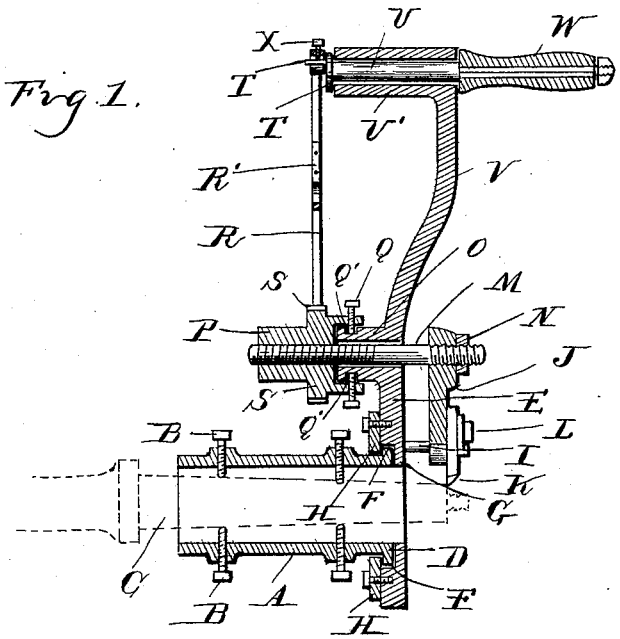
Figure 2:
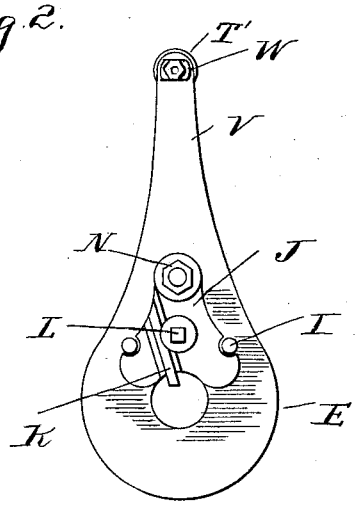
Figure 3:
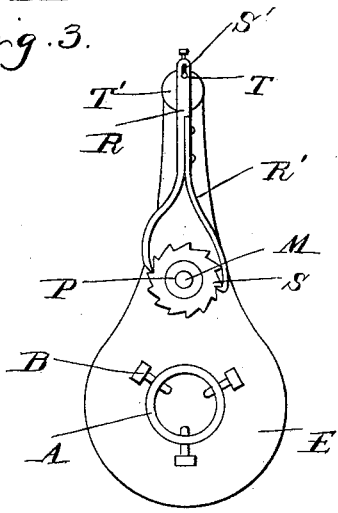

In the drawings, Figure 1 is a vertical longitudinal section. Fig. 2 is a front elevation looking from the right hand, and Fig. 3 an elevation looking from the left hand.

A is a sleeve having set-screws B of sufficient number to secure the sleeve to the axle C and to center it thereon. This sleeve at its forward end is provided with a circumferential flange D.

E is a disk or plate centrally apertured to correspond with the aperture through the sleeve and provided with a groove F, formed between the flange G and the adjustable flange or plate H. The flange D on the sleeve is adapted to engage in this groove, securing the disk to the sleeve, so that it may be rotated thereon.

I are pins secured to the front of the disk and forming guides or ways for the cutter-head J, which are suitably grooved or notched to engage with the pins to slide thereon. This cutter-head is provided with a suitable cutter K, adjustably secured in position by means of a set-screw L, so that it may be adjusted in and out.

M is a shaft engaging with the cutter-head at its forward end and secured thereto by means of suitable screw-threads held in its adjustable position by means of a nut N. This shaft extends through an apertured lug O on the disk E and extends parallel with the sleeve, being provided with an adjusting-nut P, interiorly screw-threaded and adapted to engage with the screw-threads on the shaft.

Q are set-screws engaging in a groove Q', formed on the exterior of the lug O, permitting the nut P to turn, but preventing it from endwise movement, so that in its rotation it will adjust the shaft or screw M in or out, and thus feed the cutter-head J to or from the disk E.

R is a double pawl, the arm R' thereof being preferably a spring to hold both arms in engagement with the ratchet-wheel S, formed on or secured to the nut P. This pawl at its upper end is provided with a slot S', in which a pin T on the face-plate T' engages. This face-plate is secured to a spindle U, journaled in a bearing U', formed in the end of a crank arm or extension V, secured to the disk E. The spindle is provided at its outer end with a suitable handle W, by means of which the disk may be rotated about the sleeve.

X is a set-screw in the end of the pawl, by means of which the movement of the pawl, and consequently the feed of the nut P, may be adjusted, the sleeve being secured upon the spindle of an axle, as shown in Fig. 1. The cutter-head being at its outermost position, as shown in that figure, the operator, taking hold of the handle W, turns the disk upon the sleeve, holding the handle from turning. The cutter will engage with the spindle and cut it, being fed toward or from the sleeve by the movement of the pawl R, actuated by the pin T, through the medium of the ratchet-wheel S on the adjusting-nut P. It is evident that motion in one direction will feed the cutter-head toward the disk and the motion in the opposite direction will feed it from the disk. By this construction I obtain a nicety of adjustment in the feed, which enables me to make any kind of a desired cut and to speed the device proportionate to the cut to be made. If the operator desires, by allowing the handle W to turn in his hand partially, he may further control the adjusting of the cutter-head, allowing it to turn, in this manner preventing its feeding.

What I claim as my invention is—

1. In a cutter for cylindrical bodies, the combination, with an adjustable support, of a crank-arm movably secured on the support, a cutter-head carried by the crank-arm, a screw for adjusting the cutter-head, a ratchet engaging the screw, a pawl for rotating the ratchet, and a handle loosely mounted in the crank-arm supporting said pawl, substantially as described.

2. In a cutter for cylindrical bodies, the combination, with a support, cutter-head, and a crank-arm for operating the head, of a screw for longitudinally adjusting the cutter-head, a pawl-and-ratchet mechanism for moving the screw, and an independently-movable handle in the crank-arm engaging the pawl, substantially as described.

3. In an axle-cutter, the combination of a stationary sleeve, a disk journaled at one end, guide-pins extending from the face of said disk, a cutter-head carrying a cutter slidingly engaging said pins, a screw secured to said head and passing through the disk, an adjusting-nut on the screw having a ratchet thereon, a double spring-pawl engaging said ratchet, an arm extending from said disk forming an operating-crank, a spindle journaled in the end of said arm, and a pin on the end of said spindle engaging the pawl and adapted to actuate the adjusting-nut in the rotation of the head, substantially as described.

4. In an axle-cutter, the combination of the sleeve, the disk E, journaled at one end thereof, the cutter-head J, carrying the cutter and sliding on guides secured to the disk, the screw M, the nut P, rotating in stationary bearings on the disk, the spring-pawl R, the pin T, engaging in a slot in said pawl, the set-screw X for adjusting the movement of said pin, the spindle U, to which said pin is secured, the bearing U', in which said spindle is journaled, and the extension V, supporting said bearing, substantially as described.

In testimony whereof I affix my signature in presence of two witnesses.

JOHN SWEGLES.

Witnesses:
M. B. O'DOGHERTY,
N. L. LINDOP.